P. K. DEDERICK.
HAY PRESS.

No. 177,220.  Patented May 9, 1876.

WITNESSES
Grenville Lewis
Melville Lohnurch

INVENTOR
P. K. Dederick

By

His V Ellsworth
His Attorneys

UNITED STATES PATENT OFFICE.

PETER K. DEDERICK, OF ALBANY, NEW YORK.

IMPROVEMENT IN HAY-PRESSES.

Specification forming part of Letters Patent No. 177,220, dated May 9, 1876; application filed May 26, 1875.

*To all whom it may concern:*

Be it known that I, P. K. DEDERICK, of Albany, in the county of Albany and State of New York, have invented certain Improvements in Hay-Presses, of which the following is a specification:

My invention relates to improvements on my patented continuous progressive presses, in which the hay is fed in by a reciprocating traverser, and packed in at one end of the compressing-chamber and forced out at the other; and consists in duplicating the pressing-chamber, so that the same power answers for both, and presses the hay in one while the other is reversing, as hereinafter described.

Figure 1:
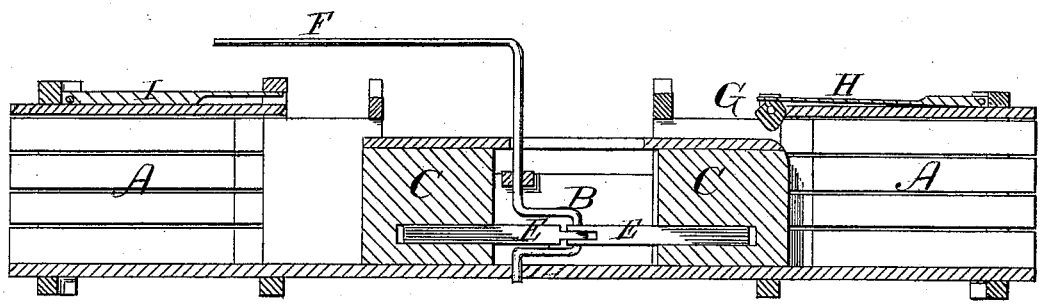
Figure 2:
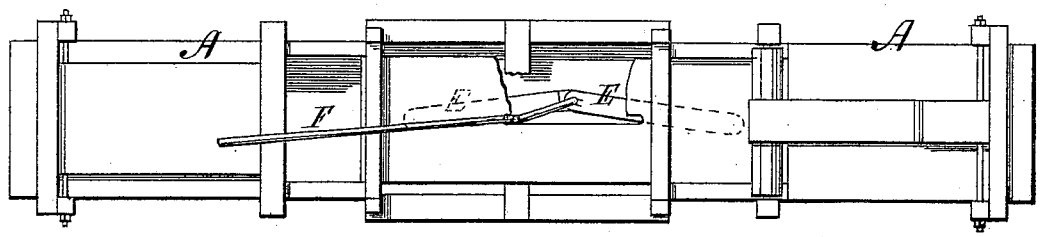

Figure 1 is a side sectional elevation. Fig. 2 is a plan or top view.

Similar letters represent similar parts.

A A are the cases of the press, one at each side of the power or crank B, and connected or constructed together in one frame. C C is the traverser, which may be in one or in two parts, connected to the power by the pitmen E E, so that one is withdrawn while the other is pressing the material. F is the sweep or horse-lever, to which the power is applied. G is the folder to fold the hay overlapping the traverser when too much is pitched into the press-box, and consists of a plank hinged or pivoted so as to form a long side or blade, which is forced out of the way of the hay and plunger by the operation of the latter, and after the traverser is withdrawn is again projected within the chamber by means of the spring H, thus folding down the hay overlapping the traverser. A spring may be differently arranged, or weights may be used with similar effect.

In all presses heretofore constructed it has been an object to make the traverser fit the box or chamber as closely as possible, so as to prevent the material from overlapping the traverser.

My previous patents on this form of press nearly all have a spring or yielding traverser-top, but fit closely. In this machine I make the traverser rigid at the top, but bevel the top corner of the traverser, or construct it small so as to leave a space between the folder or top of press case, so that the hay may overlap its top without binding it. As an additional security I construct the press-case with a yielding top either in whole or part, as shown at I, so that an entire forkful may pass between the top of the case and the follower, and the top corner of the case or guard may be beveled or rounded, as shown, for additional room, although I propose to construct machines with one or all of these devices, as occasion may require.

It will be observed, further, that the space between the traverser and top of press will always occasion the hay to overlap the traverser, thus securing what was always avoided heretofore; and by it I secure a nice fold in every instance—hence, a pretty top to the bale.

In operating the press the hay is pitched in front of the traverser C C alternately, and the operation continued until the bale is built up, thus doing double the work with the same power and in the same time that could be done with a single machine.

The chambers or boxes are always filled with pressed hay, and the charges of loose material are pressed against it and discharge or eject the finished bale as fast as a new one is constructed.

Having thus described my invention, I claim—

1. In a continuous baling-press, the two press-boxes A A, provided with tying-slots, combined with a common follower, C, substantially as described, for the purpose specified.

2. The spring or yielding top I of the press-case, substantially for the purpose set forth.

PETER K. DEDERICK.

Witnesses:
 T. W. WORDEN,
 WM. E. SMITH.